(12) United States Patent
Parla et al.

(10) Patent No.: US 11,750,611 B2
(45) Date of Patent: *Sep. 5, 2023

(54) SECURE CAPTIVE PORTAL REMEDIATION

(71) Applicant: Cisco Technology, Inc., San Jose, CA (US)

(72) Inventors: Vincent E. Parla, North Hampton, NH (US); Valentiu Vlad Santau, Littleton, MA (US); Peter Scott Davis, Wakefield, MA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 48 days.

This patent is subject to a terminal disclaimer.

(21) Appl. No.: 17/476,861

(22) Filed: Sep. 16, 2021

(65) Prior Publication Data

US 2022/0006811 A1 Jan. 6, 2022

Related U.S. Application Data

(63) Continuation of application No. 16/407,808, filed on May 9, 2019, now Pat. No. 11,171,961.

(51) Int. Cl.
*H04L 9/40* (2022.01)
(52) U.S. Cl.
CPC ............ *H04L 63/10* (2013.01); *H04L 63/029* (2013.01); *H04L 63/0272* (2013.01); *H04L 63/20* (2013.01)
(58) Field of Classification Search
None
See application file for complete search history.

(56) References Cited

U.S. PATENT DOCUMENTS

| 8,479,263 | B1* | 7/2013 | Liu ..................... H04L 63/0869 726/3 |
| 9,077,730 | B2 | 7/2015 | Parla et al. |
| 9,100,242 | B2 | 8/2015 | Nambiar et al. |
| 9,787,502 | B2 | 10/2017 | Han et al. |
| 9,820,200 | B2 | 11/2017 | Potra et al. |
| 10,454,897 | B1* | 10/2019 | Rajanna ............. H04L 63/0281 |
| 2013/0155876 | A1* | 6/2013 | Potra ..................... H04W 36/14 370/248 |
| 2016/0269380 | A1* | 9/2016 | Kishida ............... H04L 63/0272 |
| 2017/0111269 | A1 | 4/2017 | Baumgartner et al. |
| 2017/0346853 | A1* | 11/2017 | Wyatt ................. H04L 63/1425 |

(Continued)

OTHER PUBLICATIONS

W. Kumari et al., "Captive-Portal Identification in DHCP / RA", draft-ekwk-capport-rfc7710bis-02, Network Working Group, Internet-Draft, Updates: 7710 (if approved), Intended status: Standards Track, Mar. 11, 2019, 10 pages.

(Continued)

*Primary Examiner* — Joseph P Hirl
*Assistant Examiner* — Hassan Saadoun
(74) *Attorney, Agent, or Firm* — Edell, Shapiro & Finnan, LLC

(57) ABSTRACT

Methods to securely remediate a captive portal are provided. In these methods, a processor of a user device detects a connection, via a network, to a captive portal. Based on the detected connection to the captive portal, the processor launches a dedicated secure web browser, and selectively restricts access of the user device to the network in order to only allow, via the dedicated secure web browser, communications related to remediation with the captive portal.

20 Claims, 6 Drawing Sheets

(56) References Cited

U.S. PATENT DOCUMENTS

2018/0070231 A1* 3/2018 Barbu .................. H04W 12/06
2018/0309757 A1* 10/2018 Schonwald ......... H04L 63/0884

OTHER PUBLICATIONS

K. Larose et al., "CAPPORT Architecture", draft-ietf-capport-architecture-03, Internet Engineering Task Force, Internet-Draft, Intended status: Informational, Dec. 27, 2018, 17 pages.
D. Bird et al., "Captive Portal ICMP Messages", draft-wkumari-capport-icmp-unreach-02, template, Internet-Draft, Intended status: Informational, Apr. 2, 2017, 10 pages.

* cited by examiner

SECURE CAPTIVE PORTAL REMEDIATION

CROSS-REFERENCE TO RELATED APPLICATION

This application is a continuation of U.S. patent application Ser. No. 16/407,808 filed on May 9, 2019, titled "SECURE CAPTIVE PORTAL REMEDIATION", the content of which is hereby incorporated by reference in its entirety.

TECHNICAL FIELD

The present disclosure relates to network security.

BACKGROUND

Network connectivity has become a requirement for business and consumer users nearly at all times. Public networks are readily available in public places including hotels, stores, restaurants, airports, train stations, etc. To connect a user device to a public network using an open wireless network, for example, a captive portal is provided that governs access to the public network. The captive portal often requires the user to accept some terms and/or conditions, and sometimes may require a payment for use of the public network. The process of connecting to a public network via a captive portal is called remediation. By remediating with the captive portal, the user gains access to the public network and is able to use that network connectivity to engage in personal or business activities.

DESCRIPTION OF EXAMPLE EMBODIMENTS

Overview

Figure 1:
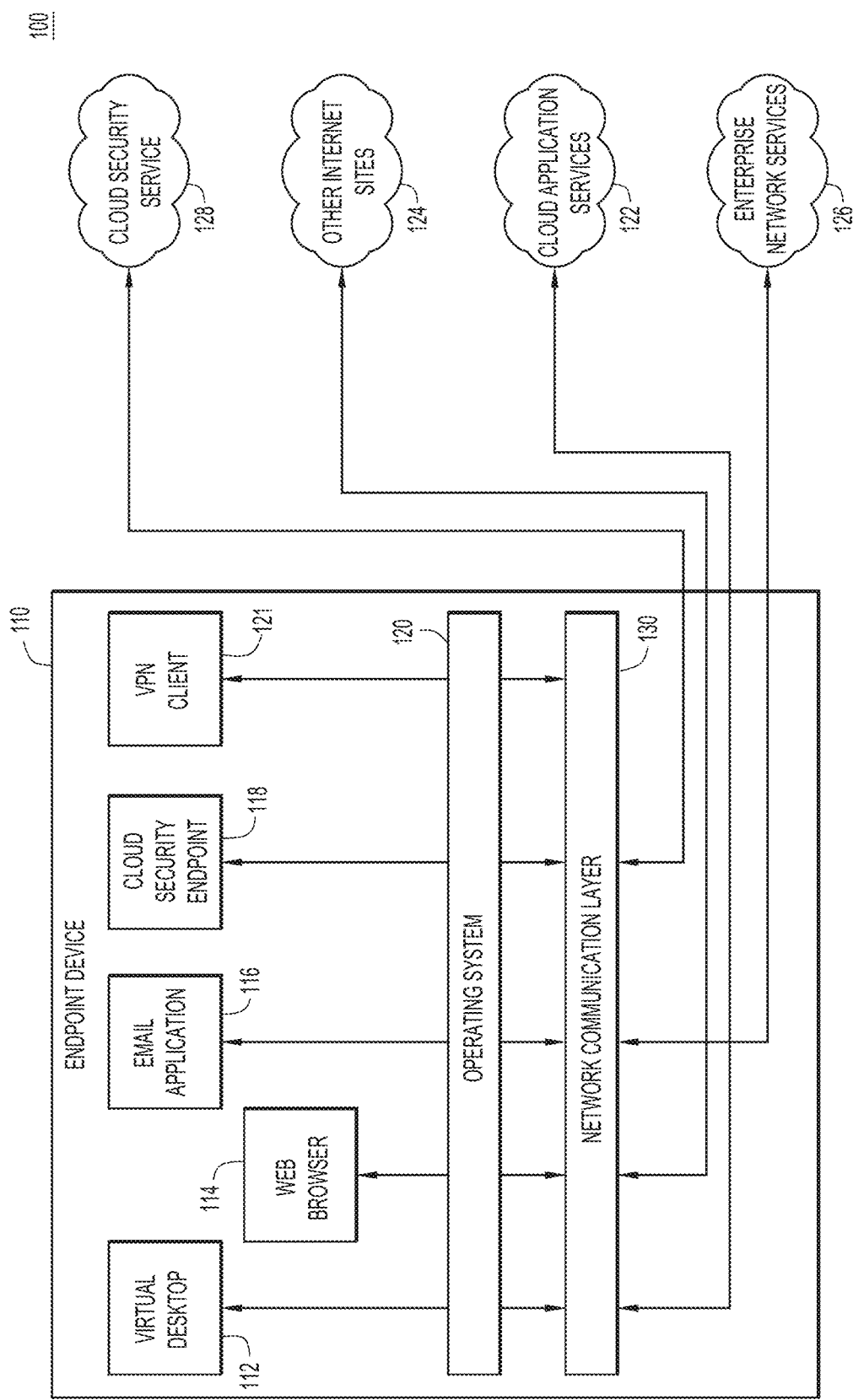
FIG. 1 is block diagram of a network environment including an endpoint device having connectivity to one or more external destinations, according to an example embodiment.

Briefly, methods to securely remediate a captive portal are provided. In these methods, a processor of a user device detects a connection, via a network, to a captive portal. Based on the detected connection to the captive portal, the processor launches a dedicated secure web browser, and selectively restricts access of the user device to the network in order to only allow, via the dedicated secure web browser, communications related to remediation with the captive portal.

Example Embodiments

Captive portals are encountered frequently in potentially hostile network environments. Captive portals may actively block most Internet bound traffic while allowing some of the traffic to go through during the remediation process. However, since the user device does not know the terms and conditions of each captive portal, applying security features becomes difficult, if not impossible. For example, some captive portals require a payment feature or a redirection to additional one or more Internet locations. This means that the user device cannot simply restrict traffic to the captive portal Internet Protocol (IP) address as a mitigation to the presented security risks. In fact, during the remediation process, Internet-based security features are blocked to allow for the remediation process with the captive portal.

Without the Internet-based security features, it is nearly impossible for the user device to distinguish between a legitimate captive portal and a malicious one. That is, captive portals may be present at wireless locations that may be compromised by an attacker or an attacker can set up a spoofed wireless local area network service set identifier (SSID) as a way of targeting unsuspecting users. For example, when a captive portal is encountered, an auto-discovery feature may alert the user by providing a self-signed warning certificate displayed to a user on a user device. An unsuspecting user will easily choose to proceed and will be tricked into connecting with a rogue server. Without realizing, the unsuspecting user would allow a middle proxy function to intercept the traffic of the captive portal.

Typically, a web browser is used to remediate the captive portal. Yet, the web browser is a common attack vector in and of itself. As such, the security risk is further exacerbated by the use of a web browser.

Additionally, data leakage is a concern when encountering captive portals. Any number of vectors exist where applications that use Hypertext Transfer Protocol/Hypertext Transfer Protocol Secure (HTTP/HTTPS), User Datagram Protocol (UDP), etc. can potentially leak data or connect to a rogue termination point by the nature of how the captive portal redirection works.

Also, since the remediation time is indeterminate, additional data leakages can occur. For example, a system needs to poll to determine when the remediation is finished and then re-apply networking restrictions that might have been present prior to the captive portal being detected. For example, an always-on virtual private network (VPN) would need to suspend forced VPN tunneling while captive portal remediation is being performed, which may result in data leakage.

In short, captive portals are most frequently encountered at the least trustworthy network locations that provide public network access and by a web browser, which is the most likely vector for malicious exploitation delivery. The user device via the web browser must be able to connect to an unknown list of potential internet facing addresses to complete the captive portal remediation. During captive portal remediation, the captive portal network device blocks cloud based network security features. Further, because the remediation is indeterminate, a system cannot enforce strict networking policies and needs to poll for completion. The network restriction policies need to be relaxed and as such, any process on the user device can potentially communicate (leak) information outside of the user device. In an example embodiment, presented herein are techniques to alleviate these attack vectors during captive portal remediation by blocking processes unrelated to the captive portal remediation, as explained in further detail below.

Reference is now made to FIG. 1. FIG. 1 is a diagram illustrating network environment 100 involving network communications of an endpoint device (also referred to herein as a user device), according to an example embodiment. As shown in FIG. 1, a user of an endpoint device 110 executes a number of applications that involve communications outside of the endpoint device 110 via a network e.g., with other servers or service providing devices. In an example embodiment, the endpoint device 110 executes a virtual desktop application 112, a web browser 114, and an email application 116. The virtual desktop application 112, web browser 114, and email application 116 may execute on top of an operating system (OS) 120. An example of another application is a virtual private network (VPN) client 121. These applications are provided by way of an example only and not by way of a limitation. The endpoint device 110 may also execute a number of other user applications such as social media applications, navigation related applications, information providing widgets, and so on. These user applications often involve communication outside of the device such as service providing devices, server, or even other user devices. For example, the virtual desktop application 112 communicates with cloud application services 122 to obtain data therefrom and to provide data thereto. The web browser 114 communicates with various Internet websites 124. Similarly, the email application 116 needs to communicate with enterprise network services 126 to receive data and send data.

To mitigate security risks associated with outside communication, the endpoint device 110 may also execute a cloud security endpoint 118. The cloud security endpoint 118 stores policies, applications, and controls that are implemented to protect the endpoint device 110 from various attacks during network communication. The cloud security endpoint 118 communicates with cloud security service 128 to obtain policies specifically dedicated to a particular user application, such as to establish a virtual private network (VPN) connection. The policies may be propagated to a network communication layer 130. When the endpoint device 110 is connected to a network, the network communication layer 130 is responsible for routing data to a respective user application and for routing data outside of the endpoint device 110 based on a set of established security policies for network communications provided by the cloud security endpoint 118.

Figure 2:
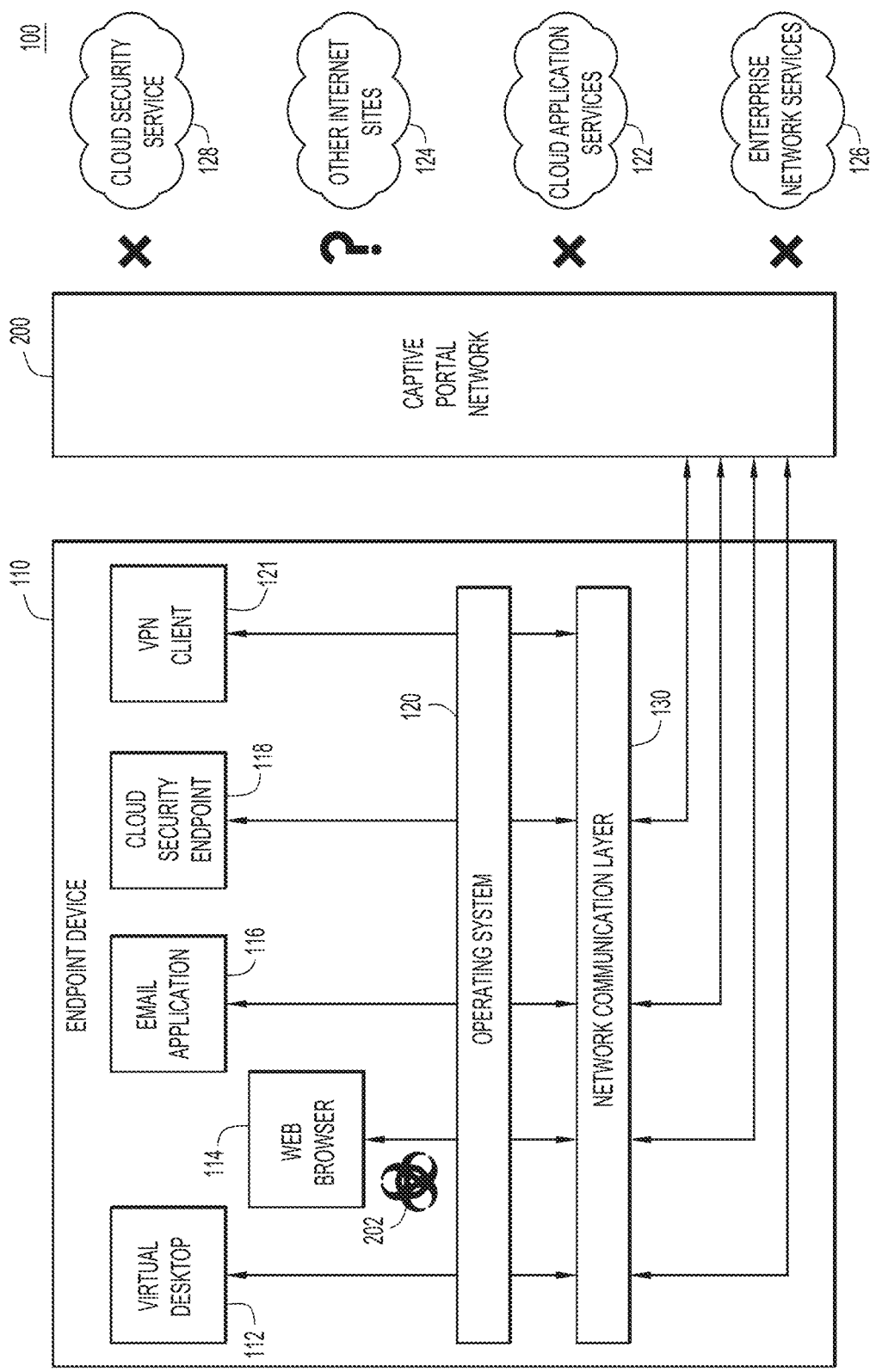
FIG. 2 is a diagram similar to FIG. 1, and showing interaction of the endpoint device with a captive portal network and security threats encountered during captive portal remediation, according to an example embodiment.

Reference is now made to FIG. 2. FIG. 2 illustrates network environment 100 but with security threats encountered during a captive portal remediation process. When a captive portal network 200 is detected, network restriction policies are disabled to allow for the captive portal remediation process. That is, since the requirements of the remediation with the captive portal are unknown and may vary from one captive portal to another captive portal, network restrictions are disabled so that the remediation can take place.

During the captive portal remediation process, the endpoint device 110 is not connected to the data network and as such cannot communicate with the cloud application services 122 and the enterprise network services 126, for example. Further, the endpoint device 110 cannot communicate with the cloud security service 128. To allow for the captive portal remediation, the web browser 114 communicates with the captive portal network 200. That is, a typical captive portal network intercepts all web traffic from devices attached to it. In other words, network traffic is redirected to the captive portal remediation page by the captive portal network upon accessing any Uniform Resource Locator (URL). Since access to other Internet websites 124 is available and remains open, the endpoint device 110 may connect to a rogue device (not shown) using the web browser 114. That is, a rogue captive portal network may redirect the browser to a malicious Internet web site, relying on the fact that all outgoing web traffic must be permitted on the device in order to remediate the captive portal. For example, the endpoint device 110 may accept a bogus certificate and connect to a rogue device. The endpoint device 110 may receive malware 202 via the web browser 114. Further, data from various user applications such as the virtual desktop application 112 and the email application 116 could be communicated from the endpoint device 110 and may result in data leakage, as explained above.

Figure 3:
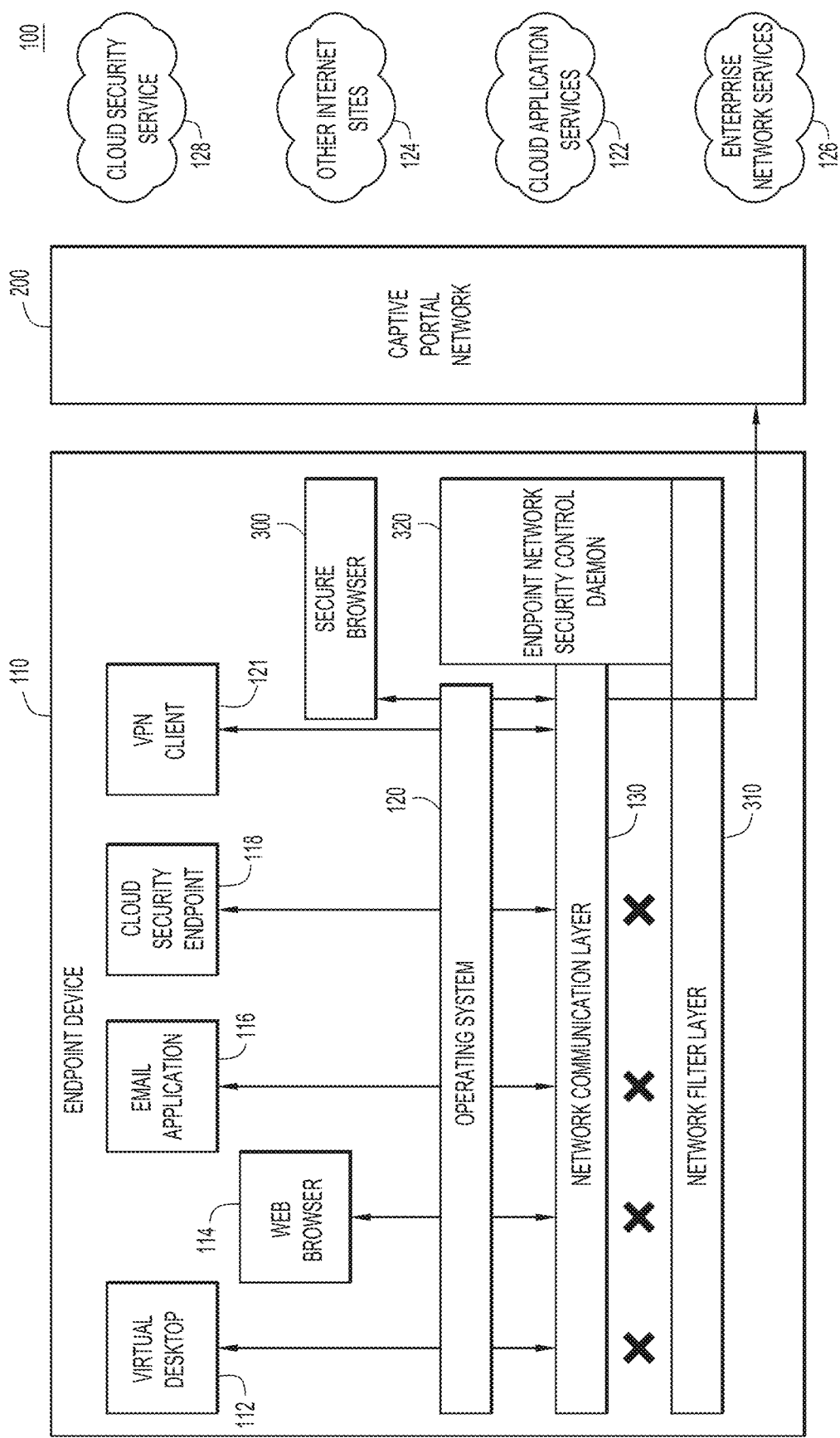
FIG. 3 is a diagram similar to FIG. 2, and illustrating the endpoint device configured to securely remediate a captive portal, according to an example embodiment.

Reference is now made to FIG. 3, which illustrates a secure captive portal remediation process, according to an example embodiment. The secure captive portal remediation process provides a mechanism to remediate the captive portal in a secure manner. Network restrictions and a limited secure browser process are provided to prevent data leakages and protect the endpoint device 110 from being compromised while network-based security features, such as cloud security endpoint 118 cannot reach cloud security service 128. To enable the secure captive portal remediation process, the endpoint device 110 is configured with a secure browser 300, a network filter layer 310, and an endpoint network security control daemon 320.

The secure browser 300 is a browser function that is separate from the web browser 114 and is dedicated to communicating with the captive portal network 200. In other words, during the remediation process, the only allowed communications are via the secure browser 300.

The network filtering layer 310 (controlled by the endpoint network security control daemon 320) is in charge of allowing the necessary network access to the secure browser process via the secure browser 300, and block access to any other processes. While the secure browser 300 is permitted to pass any web traffic, since it is indeterminate what web pages may need to be visited in order to complete the captive portal remediation. Once the captive portal is remediated by the end user, the endpoint network security control daemon 320 will detect that (via network probing) the end of captive portal remediation and close the secure browser 300, as no longer necessary. The network filter layer 310 prevents other processes on the endpoint device 110 from communicating outside the endpoint device 110 during the captive portal remediation process. That is, data from the virtual desktop application 112, the web browser 114, the email application 116, and the cloud security endpoint 118, are blocked from being communicated outside of the endpoint device 110. Also, since the web browser 114 is no longer part of the captive portal remediation process, it does not need to address the problem of security attacks during remediation. In other words, the web browser 114 can no longer be subjected to attacks during the remediation since it lacks network access.

The secure browser 300 and the endpoint network security control daemon 320 exclusively handle the remediation process with the captive portal network 200. During the remediation process with the captive portal network 200, the endpoint network security control daemon 320 restricts or limits all network traffic to/from the endpoint device 110 to only the secure browser 300. That is, during the captive portal remediation process, the only process on the endpoint device 110 that can communicate outside of the endpoint device 110 is the secure browser 300.

Specifically, the endpoint network security control daemon 320 detects the presence of the captive portal network 200 and launches the secure browser 300. The secure browser 300 is a custom browser dedicated to the captive portal remediation process. The secure browser 300 is a limited or restricted browser that cannot run any controls or allow for content downloads. The secure browser 300 has limited functionality that is strictly and directly related to the remediation process with the captive portal network 200. The endpoint network security control daemon 320 configures the network filter layer 310 to block all other inbound and outbound traffic with respect to the endpoint device 110. As such, the endpoint network security control daemon 320 prevents all inbound and outbound traffic except for the traffic related to captive portal remediation, and the captive portal remediation traffic is directed to the secure browser 300, which is dedicated to the remediation of the captive portal.

The endpoint network security control daemon 320 further detects when the captive portal network 200 has been remediated, and closes the secure browser 300 and disables the network filter layer 310. The endpoint network security control daemon 320 further configures the endpoint device 110 to reapply any prior network restriction policies that were being executed prior to the captive portal remediation process. In other words, after captive portal remediation is complete, the endpoint network security control daemon 320 cancels all of its restrictions implemented when it detected the captive portal and during the captive portal remediation process. Network restrictions or network access policies of the cloud security endpoint 118 are re-instituted on the endpoint device 110, along with any other security measures configured on the endpoint device 110.

Figure 4:
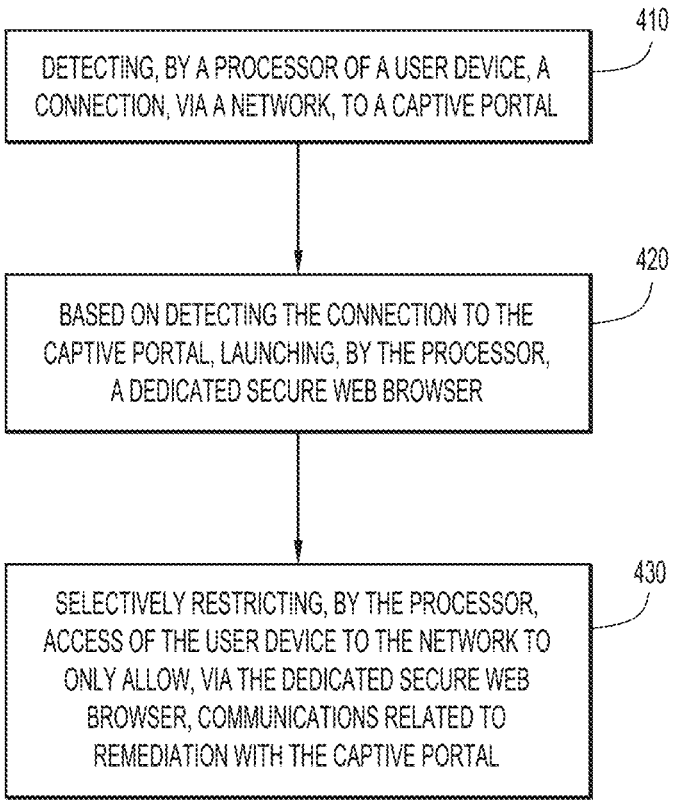
FIG. 4 is a flowchart illustrating a method for securely remediating a captive portal, according to an example embodiment.

FIG. 4 is a flowchart for a method 400 of captive portal remediation process, according to an example embodiment. Reference is also made to FIG. 3 for purposes of the description of FIG. 4. The method 400 is performed by an endpoint device, e.g., endpoint device 110 shown in FIG. 3, such as a user device. Non-limiting examples of a user device include a smartphone, a personal data assistant (PDA), a laptop computer, a personal desktop computer, and any other computing device that has network connectivity.

At 410, a processor of the endpoint device detects a connection, via a network, to a captive portal. Based on detecting the connection to the captive portal, the processor launches a dedicated secure web browser, e.g., secure browser 300, at 420.

After launching the dedicated secure web browser, the processor of the endpoint device 110 may load a URL that redirects the dedicated secure web browser to a captive portal remediation page. This URL may take any of a variety of forms. The processor may further execute the endpoint network security control daemon 320 that detects the connection to the captive portal and updates at least one network access restriction of the user device. As an example, the endpoint network security control daemon 320 may detect incoming and outgoing traffic and if a URL returns a result other than what is expected based on the traffic, the endpoint network security control daemon 320 declares that a captive portal.

At 430, the processor of the user device selectively restricts access of the user device to the network to only allow, via the dedicated secure web browser, communications related to the remediation with the captive portal.

According to one or more example embodiments, the method 400 may further include remediating with the captive portal. The remediation with the captive portal process may involve displaying, on the dedicated secure web browser, content received from the captive portal. The dedicated secure web browser obtains user input related to obtaining access to the captive portal. The secure web browser provides the user input to the captive portal. This communication is permitted by the endpoint network security control daemon. The secure web browser obtains from the captive portal, a response indicating that access to the captive portal is granted or that further input is required to obtain the access to the captive portal. The endpoint network security daemon periodically poll the secure web browser (or operating system of the endpoint device) to detect completion of captive portal remediation.

When the completion of remediation with the captive portal is detected and the response from the captive portal indicates that the access to the network is granted, the method 400 may further include the network security control daemon updating at least one network access restriction of the user device by reapplying/re-instituting one or more network access restrictions on the user device that existed prior to the detection of the captive portal.

According to one or more example embodiments, the operation 430 of selectively restricting the access by the user device to the network may include updating at least one network access restriction of the user device such that one or more user applications, executed by the processor, are blocked from the access to the network. The one or more user applications may include a web browser and virtualized desktop applications, social media applications, email applications, and/or content streaming applications.

The selectively restricting operation 430 may include blocking transmission of data from the one or more user applications to one or more destinations external to the user device. According to one or more example embodiments, the selectively restricting operation 430 may include updating at least one network access restriction of the user device such that data received by the user device from sources external to the user device is dropped without being processed.

Figure 5:
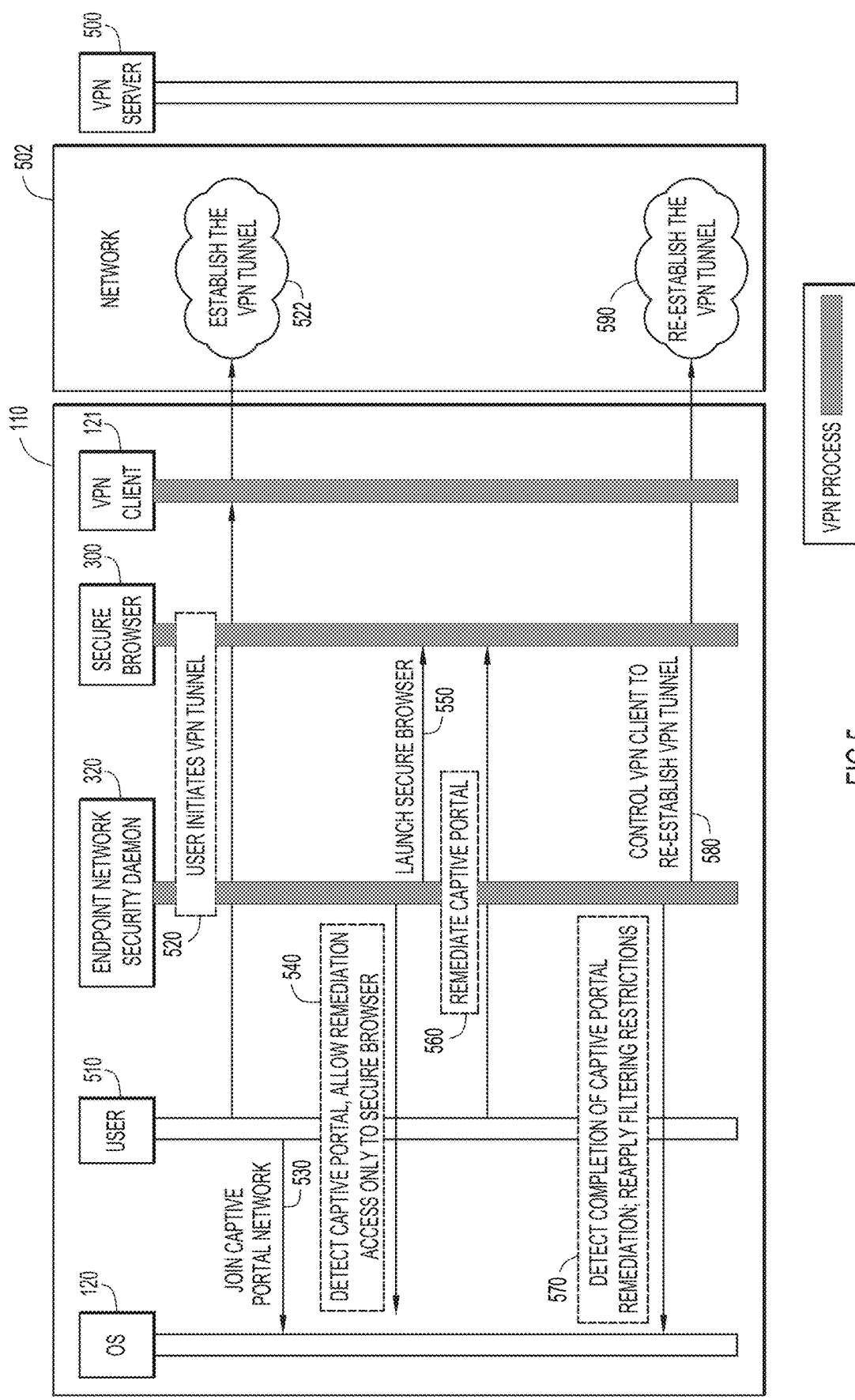
FIG. 5 is a sequence diagram illustrating a virtual private network use case for the method depicted in FIG. 4, according to an example embodiment.

FIG. 5 is a flow diagram illustrating an example use case of the method 400 depicted in FIG. 4 when encountering a captive portal during establishment of a virtual private network (VPN) connection between an endpoint device 110 (user device) and a VPN server shown at 500, via network 502, according to an example embodiment. According to an example embodiment, a VPN connection is used as an example of a network enforcement feature used by the endpoint device 110 by way of an example only. The captive portal remediation process can be applied to any number of other scenarios that do not involve a VPN connection. The endpoint device 110 includes the operating system (OS) 120 and the VPN client 121. The endpoint device 110 further includes the secure browser 300 and an endpoint network security daemon 320, as described above with reference to FIG. 3.

As shown in FIG. 5, the user 510 initiates a VPN tunnel process with the VPN client 121. For example, in operation 520, the user initiates a VPN tunnel by opening the VPN client 121 that in turn, at 522, connects, via network 502, to the VPN server 500 in order to establish the VPN tunnel. In operation 530, the user 510 may decide to join a network which involves a captive portal (a captive portal network). For example, the user may decide to connect to a public network such as a public wireless local area network (WLAN) or an open wireless network (public Wi-Fi® network). In another scenario, the attempt by the VPN client 121 to connect to the VPN server 500 via an open wireless network may cause an automatic redirect to a captive portal network. In any event, the network 502 is a network that may involve remediation with a captive portal.

In operation 540, the endpoint network security control daemon 320 detects the captive portal. When the endpoint network security control daemon 320 detects the captive portal, it updates network restrictions and provides the updated network restrictions to the operating system (OS) 120. The updated network restrictions include directives to block all outgoing traffic from any of the applications running on the endpoint device 110 such that no applications, other than the secure browser 300 of the endpoint device 110, can connect to the network 502 during the captive portal remediation process. The updated network restrictions further include directives to restrict access to only allow captive portal remediation access through the secure browser 300. Since the secure browser 300 has limited functionality, no content can be downloaded from the network 502 via the secure browser 300 other than the web pages and their embedded content and no controls can be executed via the secure browser 300 such as ActiveX® controls.

In operation 550, the secure browser 300 is launched. Additionally, the endpoint network security control daemon 320 loads a URL that ensures a redirection of all traffic to the captive portal remediation page.

At 560, the user 510 interacts with the secure browser 300 to remediate the captive portal. As explained above, the captive portal may be a webpage displayed by the secure browser 300, which requires the user 510 to accept certain conditions and usage policies, or may require a log-in, an authentication, and/or a payment.

At 570, the endpoint network security control daemon 320 detects completion of the captive portal remediation, and when completion is detected, reapplies filtering restrictions. For example, the endpoint network security control daemon 320 periodically polls the OS 120 and/or the secure browser 300 to determine whether the captive portal remediation process is complete. In an example embodiment, full network access restriction policies such as cloud security policies described above with reference to FIG. 3, are reapplied. That is, full network access restriction policies are policies applied during normal network communication and as dictated by network policies of the respective endpoint device and a respective application. In short, when the captive portal is remediated, the endpoint network security control daemon 320 reapplies any prior network restriction policies that may have been in place to prevent data leakage and other attacks. At 580, the endpoint network security control daemon 320 controls the VPN client 121 to re-establish the VPN tunnel with the VPN server 500, and at 590, the VPN tunnel is re-established.

Thus, as depicted in FIG. 5, according to one or more example embodiments, a processor of an endpoint device (user device) may initiate a VPN tunnel with a VPN server. When the connection to the captive portal is detected, the processor may update existing network access restrictions to block traffic to and from the VPN server. The processor then detects successful completion of remediation with the captive portal. When successful completion of the remediation with the captive portal is detected, the network access restrictions of the user device are updated to reapply existing network access restrictions. When the network access restrictions are updated to the existing network access restrictions, the processor reestablishes the VPN tunnel with the VPN server.

Figure 6:
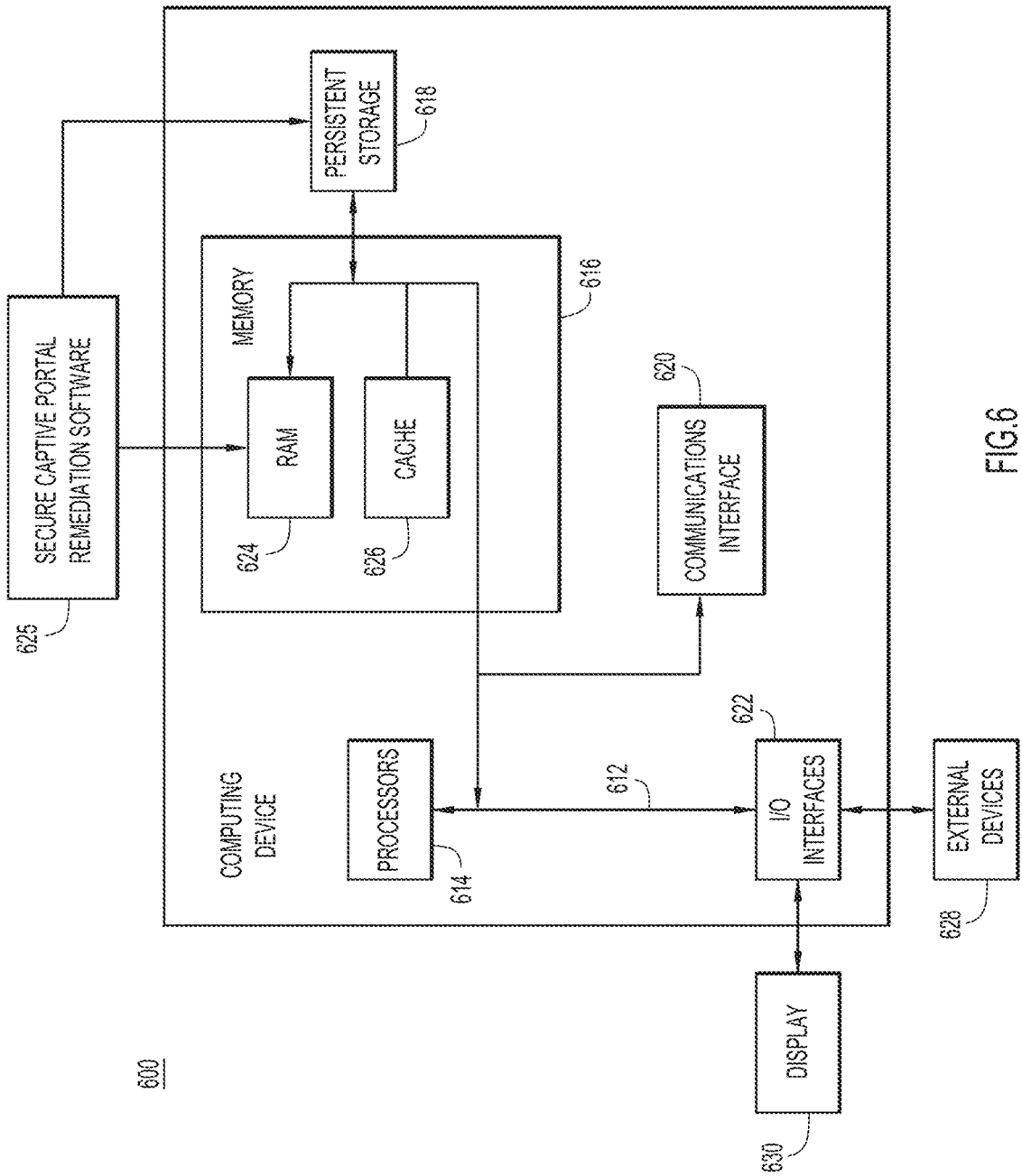
FIG. 6 is a block diagram of an apparatus configured to securely remediate a captive portal, according to an example embodiment.

FIG. 6 is a hardware block diagram illustrating a computing device 600 that may perform the functions of the endpoint device (user device) referred to herein in connection with FIGS. 1-5. It should be appreciated that FIG. 6 provides only an illustration of one embodiment and does not imply any limitations with regard to the environments in which different embodiments may be implemented. Many modifications to the depicted environment may be made.

As depicted, the device 600 includes a bus 612, which provides communications between computer processor(s) 614, memory 616, persistent storage 618, communications unit 620, and input/output (I/O) interface(s) 622. The bus 612 can be implemented with any architecture designed for passing data and/or control information between processors (such as microprocessors, communications and network processors, etc.), system memory, peripheral devices, and any other hardware components within a system. For example, bus 612 can be implemented with one or more buses.

The memory 616 and persistent storage 618 are computer readable storage media. In the depicted embodiment, memory 616 includes random access memory (RAM) 624 and cache (cache memory) 626. In general, memory 616 can include any suitable volatile or non-volatile computer readable storage media. Instructions for secure captive portal remediation software 625 may be stored in memory 616 or persistent storage 618 for execution by processor(s) 614. The secure captive portal remediation software 625 includes instructions for the secure browser 300, network filter layer 310 and endpoint network security control daemon 320 shown in FIG. 3.

One or more programs may be stored in persistent storage 618 for execution by one or more of the respective computer processors 614 via one or more memories of memory 616. The persistent storage 618 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by the persistent storage 618 may also be removable. For example, a removable hard drive may be used for persistent storage 618. Other examples include optical and magnetic disks, thumb drives, and smart cards that are inserted into a drive for transfer onto another computer readable storage medium that is also part of persistent storage 618.

The communications unit 620, in these examples, provides for communications with other data processing systems or devices. In these examples, communications unit 620 includes one or more network interface cards. Communications unit 620 may provide communications through the use of either or both physical (wired) and wireless communications links.

The I/O interface(s) 622 allows for input and output of data with other devices that may be connected to computer device 600. For example, the I/O interface 622 may provide a connection to external devices 628 such as a keyboard, keypad, a touch screen, and/or some other suitable input device. External devices 628 can also include portable computer readable storage media such as database systems, thumb drives, portable optical or magnetic disks, and memory cards.

Software and data used to practice embodiments can be stored on such portable computer readable storage media and can be loaded onto persistent storage 618 via I/O interface(s) 622. I/O interface(s) 622 may also connect to a display 630. The display 630 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing system employed by the present embodiments may be implemented by any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The present embodiments may employ any number of any type of user interface (e.g., Graphical User Interface (GUI), command-line, prompt, etc.) for obtaining or providing information (e.g., data relating to providing enhanced delivery options), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

[ow] The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In summary, in one embodiment, a method is provided comprising: detecting, by a processor of a user device, a connection, via a network, to a captive portal; based on detecting the connection to the captive portal, launching, by the processor, a dedicated secure web browser; and selectively restricting, by the processor, access of the user device to the network to only allow, via the dedicated secure web browser, communications related to remediation with the captive portal.

In still another embodiment, an endpoint device (apparatus) is provided that includes a communication interface configured to enable network communications on a network, a memory configured to store executable instructions, and a processor coupled to the communication interface and the memory. The processor is configured to detect a connection, via a network, to a captive portal. The processor is further configured to, based on the connection to the captive portal detected by the processor, launch a dedicated secure web browser and to selectively restrict access of the apparatus to the network to only allow, via the dedicated secure web browser, communications related to remediation with the captive portal.

In yet another embodiment, one or more non-transitory computer readable storage media encoded with instructions is provided. When the instructions encoded in the one or more non-transitory computer readable storage media are executed by a processor of a user device, the instructions cause the processor to execute a method. The method includes detecting a connection, via a network, to a captive portal, based on detecting the connection to the captive portal, launching a dedicated secure web browser, and selectively restricting access of the user device to the network to only allow, via the dedicated secure web browser, communications related to remediation with the captive portal.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   detecting, by a processor of a user device, a connection, via a network, to a captive portal;
   based on detecting the connection to the captive portal, launching, by the processor, a dedicated secure web browser; and
   performing, by the processor, a remediation process with the captive portal using the dedicated secure web browser while blocking access to the network to at least one of a web browser service and one or more user applications running on the user device.

2. The method of claim 1, further comprising:
   based on the launching of the dedicated secure web browser, loading, by the processor, a universal resource locator (URL) that redirects the dedicated secure web browser to a captive portal remediation page.

3. The method of claim 2, further comprising:
   executing, by the processor, a network security control daemon that detects the connection to the captive portal and updates at least one network access restriction of the user device;
   performing the remediation process with the captive portal by:
      displaying, on the dedicated secure web browser, content received from the captive portal,
      obtaining, via the dedicated secure web browser, user input related to obtaining access to the network of the captive portal,
      providing the user input to the captive portal, and
      obtaining, from the captive portal, a response indicating one of:
         access to the network is granted, and
         further input is required to obtain access to the network; and
   periodically polling to detect completion of the remediation process with the captive portal.

4. The method of claim 3, further comprising:
   based on detecting the completion of the remediation process and the response indicating that access to the network is granted, updating, by the network security control daemon, the at least one network access restriction of the user device by reapplying one or more network access restrictions executed by the processor prior to detecting the connection to the captive portal.

5. The method of claim 3, based on detecting the completion of the remediation process and the response indicating that access to the network is granted, providing access to the network to the web browser service.

6. The method of claim 1, further comprising:
   updating at least one network access restriction of the user device such that the one or more user applications, executed by the processor, are blocked from accessing the network.

7. The method of claim 6, wherein the one or more user applications include virtualized desktop applications, social media applications, email applications, or content streaming applications.

8. The method of claim 1, further comprising:
   initiating, by the processor, a virtual private network (VPN) tunnel with a VPN server;
   based on detecting the connection to the captive portal, updating, by the processor, one or more existing network access restrictions to one or more captive portal network access restrictions which include blocking data to and from the VPN server;
   detecting, by the processor, a successful completion of remediation with the captive portal;
   based on the detecting the successful completion of remediation with the captive portal, updating the one or more captive portal network access restrictions of the user device to re-apply the one or more existing network access restrictions; and
   based on updating to re-apply the one or more existing network access restrictions, reestablishing the VPN tunnel with the VPN server.

9. The method of claim 1, wherein the dedicated secure web browser is dedicated to communicating with a captive portal network and is a browser function that is separate from the web browser service.

10. An apparatus comprising:
    a communication interface configured to enable network communications on a network;
    a memory configured to store executable instructions; and
    a processor coupled to the communication interface and the memory, and configured to:
       detect a connection, via & the network, to a captive portal;
       based on the connection to the captive portal detected by the processor, launch a dedicated secure web browser; and
       perform a remediation process with the captive portal using the dedicated secure web browser while blocking access to the network to at least one of a web browser service and one or more user applications running on the apparatus.

11. The apparatus of claim 10, wherein the processor is further configured to load a universal resource locator (URL) that redirects the dedicated secure web browser to a captive portal remediation page.

12. The apparatus of claim 11, further comprising:
    a display; and
    a user interface,
    wherein the processor is further configured to:
       execute a network security control daemon that detects the connection to the captive portal and updates at least one network access restriction of the apparatus;
       remediate with the captive portal by:
          displaying, on the display, the dedicated secure web browser including content received from the captive portal, obtaining, via the user interface, user input related to obtaining access to the captive portal, providing the user input to the captive portal, and obtaining, from the captive portal, a response indicating one of:
- access to the network is granted, and
- further input is required to obtain the access to the network; and periodically poll to detect completion of remediation with the captive portal.

13. The apparatus of claim 12, wherein the processor is further configured to:
based on completion of the remediation process being detected and the response indicating that the access to the network is granted, update the at least one network access restriction of the apparatus by reapplying one or more network access restrictions executed by the processor prior to the connection to the captive portal being detected.

14. The apparatus of claim 12, wherein the processor is further configured to:
based on completion of the remediation process being detected and the response indicating that the access to the network is granted, provide the access to the network to the web browser service.

15. The apparatus of claim 10, wherein the processor is further configured to:
update at least one network access restriction of the apparatus such that the one or more user applications, being executed by the processor, are blocked from accessing the network.

16. The apparatus of claim 15, wherein the one or more user applications include virtualized desktop applications, social media applications, email applications, or content streaming applications.

17. One or more non-transitory computer readable storage media encoded with instructions that, when executed by a processor of a user device, cause the processor to execute a method comprising:
detecting a connection, via a network, to a captive portal;
based on detecting the connection to the captive portal, launching a dedicated secure web browser; and
performing a remediation process with the captive portal using the dedicated secure web browser while blocking access to the network to at least one of a web browser service and one or more user applications running on the user device.

18. The one or more non-transitory computer readable storage media of claim 17, further comprising instructions that cause the processor to:
based on the launching of the dedicated secure web browser, loading, by the processor, a universal resource locator (URL) that redirects the dedicated secure web browser to a captive portal remediation page.

19. The one or more non-transitory computer readable storage media of claim 18, further comprising instructions that cause the processor to:
execute a network security control daemon that detects the connection to the captive portal and updates at least one network access restriction of the user device;
performing the remediation process with the captive portal by:
displaying, on the dedicated secure web browser, content received from the captive portal,
obtaining, via the dedicated secure web browser, user input related to obtaining access to the network of the captive portal,
providing the user input to the captive portal, and
obtaining, from the captive portal, a response indicating one of:
- access to the network is granted, and
- further input is required to obtain the access to the network; and periodically polling to detect completion of the remediation process with the captive portal.

20. The one or more non-transitory computer readable storage media of claim 19, further comprising instructions that cause the processor to:
based on detecting the completion of the remediation process and the response indicating that the access to the network is granted, updating, by the network security control daemon, the at least one network access restriction of the user device by reapplying one or more network access restrictions executed by the processor prior to detecting the connection to the captive portal.

\* \* \* \* \*

UNITED STATES PATENT AND TRADEMARK OFFICE
CERTIFICATE OF CORRECTION

| | | |
|---|---|---|
| PATENT NO. | : 11,750,611 B2 | |
| APPLICATION NO. | : 17/476861 | |
| DATED | : September 5, 2023 | |
| INVENTOR(S) | : Vincent E. Parla et al. | |

It is certified that error appears in the above-identified patent and that said Letters Patent is hereby corrected as shown below:

In the Claims

Claim 10, Column 14, Line 43, please replace "detect a connection, via & the network" with --detect a connection, via the network--

Signed and Sealed this
Fourteenth Day of November, 2023

Katherine Kelly Vidal
*Director of the United States Patent and Trademark Office*